United States Patent [19]

Bonta

[11] Patent Number: 5,432,843
[45] Date of Patent: Jul. 11, 1995

[54] METHOD OF PERFORMING HANDOFF IN A CELLULAR COMMUNICATION SYSTEM

[75] Inventor: Jeffrey D. Bonta, Arlington Heights, Ill.

[73] Assignee: Motorola Inc., Schaumburg, Ill.

[21] Appl. No.: 100,230

[22] Filed: Aug. 2, 1993

[51] Int. Cl.[6] .............................................. H04Q 7/38
[52] U.S. Cl. ........................................ 379/60; 455/33.2
[58] Field of Search ................... 379/59, 60; 455/33.1, 455/33.2

[56] References Cited

U.S. PATENT DOCUMENTS

| | | | |
|---|---|---|---|
| 4,654,867 | 3/1987 | Labedz et al. | 455/33.2 |
| 4,696,027 | 9/1987 | Bonta | 379/60 |
| 4,737,978 | 4/1988 | Burke et al. | 379/60 |
| 5,179,559 | 1/1993 | Crisler et al. | 370/95.1 |
| 5,189,734 | 2/1993 | Bailey et al. | 379/60 |
| 5,289,525 | 2/1994 | Issenman et al. | 455/33.2 |

Primary Examiner—Curtis Kuntz
Assistant Examiner—Dwayne D. Bost
Attorney, Agent, or Firm—Anthony G. Sitko

[57] ABSTRACT

The method consists of analyzing a handoff request received from a source base station at a source base site controller (BSC). If the handoff request contains a preferred base site list (is from a MAHO environment) the request is forwarded to the mobile switching center. If the handoff request does not contain the preferred list, the BSC generates a candidate list and transmits measurement messages to each candidate base site. The candidate base sites take measurements and reply to the BSC. The BSC uses the replies to generate a preferred base site list which is forwarded to the MSC. When the MSC receives a preferred base site list, it selects a handoff base site and executes the handoff.

8 Claims, 3 Drawing Sheets

METHOD OF PERFORMING HANDOFF IN A CELLULAR COMMUNICATION SYSTEM

FIELD OF THE INVENTION

The present invention relates, in general, to radio frequency (RF) communications and, more particularly, to a method of performing handoff in a cellular communication system.

BACKGROUND OF THE INVENTION

In a cellular communication system, a communication link is established between a mobile station, or subscriber, and a source base station. As the mobile station moves out of range of the source base station, the signal quality will degrade until the communication link would ultimately be broken and the call "dropped". At this point, the communication link is shifted from the source base station to a target base station. The process of making this shift is commonly referred to in the cellular communication area as a handoff process.

Presently, handoffs are performed, generally, in two different ways. In analog type systems, such as the analog mobile phone system (AMPS), a handoff is accomplished by the system without assistance from the mobile station. When the signal received by the source base station degrades past a certain point, the source base station sends a message to the mobile switching center (MSC), by way of a base station controller (BSC), requesting that a handoff be conducted. Upon receipt of the request, the MSC sends messages to candidate base stations requesting that each measure a parameter, generally signal strength, of a signal transmitted by the mobile station. The candidate base stations make the measurement and return the results to the MSC. The MSC then makes the determination as to which candidate base station will be selected as the handoff, or target, base station. The MSC then orders the necessary connections to the handoff base station and directs the target base station to become the source base station. At the same time, the source base station is directed to discontinue serving the mobile station.

The above is the traditional type of handoff. In newer systems—such as time division multiple access (TDMA) and code division multiple access (CDMA) systems—a mobile assisted handoff (MAHO) process is utilized. In a MAHO type of system, the mobile station is provided with a list of candidate base stations. At intermittent times, the mobile station will measure a signal quality parameter of transmissions from the listed candidate base stations. The quality parameter may be signal strength, or other appropriate parameter; such as energy per chip per total noise ($E_C/I_O$), bit error rate (BER), frame erasure rate (FER), or color code. These measurements are gathered to determine a preferred list of target base stations and; when directed, the preferred list is reported to the MSC, by way of base station and BSC. The MSC then takes the same action as previously in selecting a handoff base station and directing the handoff.

The above processes are the two basic types of handoff. There are a number of variations within these basic types. For example, there is "soft" handoff. This occurs when the handoff base station starts serving the mobile station before the source base station discontinues service. There is also a softer handoff which is a soft handoff between two sectors within the same cell. In addition, the term "handover" is often substituted for the term "handoff" in certain geographic areas such as Europe.

Because of the difference in operation between the two handoff schemes, an AMPS base station, and BSC, cannot be coupled to a TDMA MSC and vice-versa. This is a disadvantage when a service provider decides to upgrade a system using a different air interface technology since the new technology would also require an additional MSC. Therefore, there is a need in the industry to provide a standard interface between a BSC and MSC which would permit a single MSC to operate with either an AMPS or TDMA/CDMA system without requiring an operating change in either of those systems.

SUMMARY OF THE INVENTION

A method of performing handoff of a mobile station in a cellular communication system begins with the receipt of a handoff request by the source base site controller from the source base site. The handoff request is analyzed by the source base site controller (BSC) to determine if a preferred base site list is present. In non-MAHO systems, a preferred candidate list will not be present. In a MAHO system, a preferred candidate list will be present. If the handoff request contains a preferred base site list the request is forwarded to the mobile switching center. If the handoff request does not contain the preferred list, the BSC generates a candidate list and transmits measurement messages to each candidate base site. The candidate base sites take measurements (such as signal strength, color code, etc.) and reply to the BSC. The BSC uses the replies to generate a preferred base site list which is forwarded to the MSC. When the MSC receives a preferred base site list, it selects a handoff base site and executes the handoff.

DETAILED DESCRIPTION OF THE DRAWINGS

Figure 1:
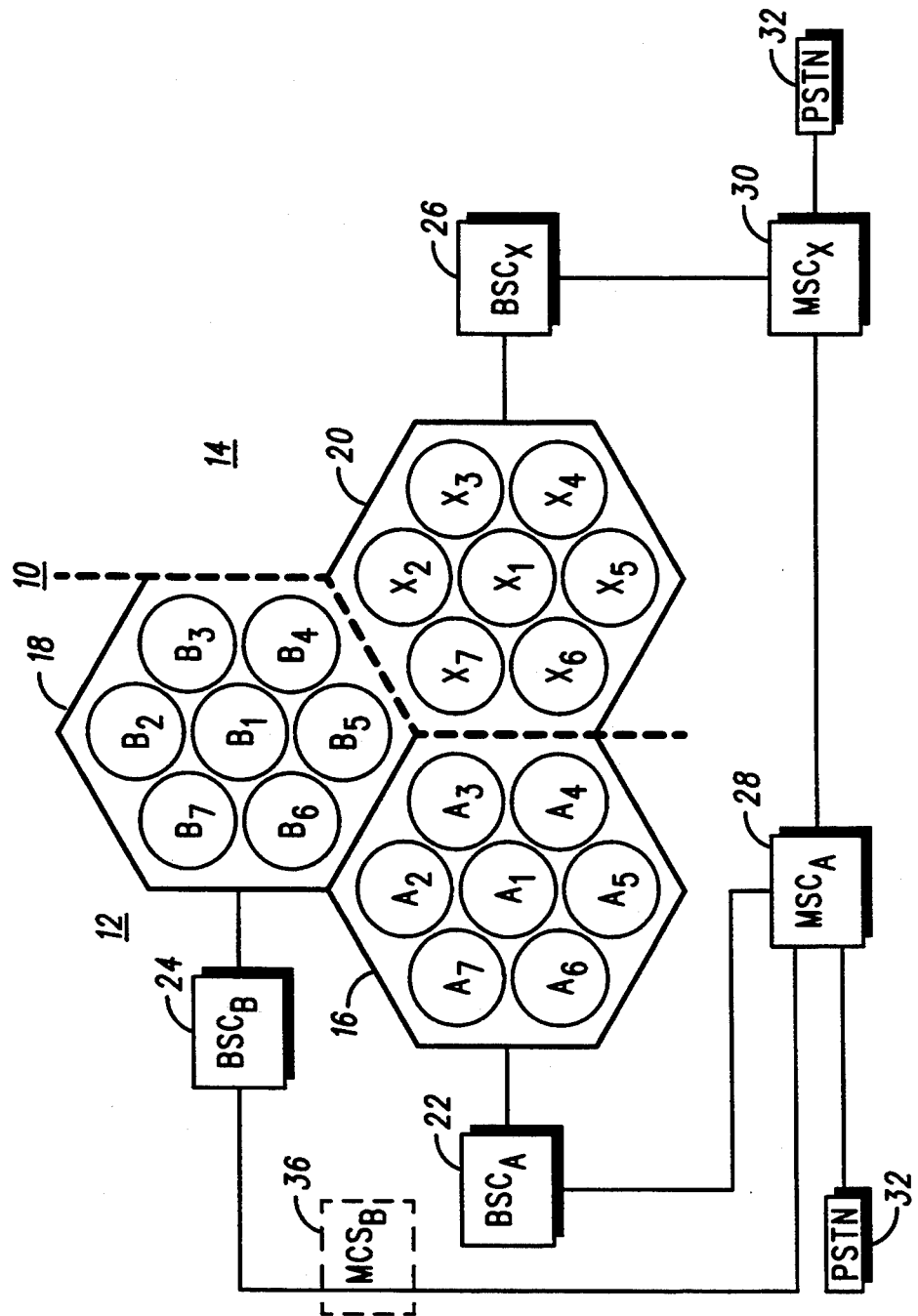
FIG. 1 is a cellular coverage diagram in which the present invention is utilized.

Referring initially to FIG. 1, a cellular coverage diagram, generally designated 10, is illustrated. Diagram 10 is divided into two cellular systems 12 and 14. While systems 12 and 14 are illustrated in matching patterns, it should be noted that this is not a typical case and there may be an overlap of the two systems. Systems 12 and 14 are both illustrated with a seven cell reuse pattern $A_1-A_7$ (16), $B_1-B_7$ (18), and $X_1-X_7$ (20). Each cell has a base station associated therewith which is coupled to a base site controller $BSC_A$ (22), $BSC_B$ (24), AND $BSC_C$ (26). It should be understood that the base station and its BSC may be physically located in the same unit. However, the functionally of these are two different items.

For purposes of the present example, base stations A will be using a CDMA communication protocol and base stations B will be using an AMPS communication protocol. The present invention permits base station controllers 22 and 24 to be coupled to the same mobile switching center $MSC_A$ (28). Since base station controller 26 is in a separate system, it is coupled to a separate $MSC_X$ (30). The MSCs are coupled into the public switching telephone network (PSTN) 32. The MSCs are also coupled to each other using a IS-41 (Interim Standard-41) This interim standard is specified by the Telecommunications Industry Association (TIA) specifies the communication protocol between MSCs.

In the prior art, it would also have been necessary to provide a third MSC, $MSC_B$ (36). This is because of the different messages transmitted from the BSCs using different communication protocols. As an example, a mobile station moving from base site $B_6$ to $A_2$ will be utilized. In the prior art, $BSC_B$ would provide a message to the $MSC_B$ indicating that a handoff was needed. $MSC_B$ would then generate a list of candidate base stations (e.g. $A_2$, $A_3$, and $B_5$). A message would then be sent from $MSC_B$ to each of these candidate base stations requesting each candidate base station to make a measurement of the signal being transmitted by the mobile station. These measurements would then be transmitted back to $MSC_B$ where a decision would be made as to which candidate base station would be the handoff base station.

If the above situation were reversed and the mobile station was moving from base site A2 to B6, then the mobile would be given a list of possible candidate base stations (e.g. $A_3$, $B_5$, and $B_6$). The mobile would then measure the desired parameter (signal strength, $E_C/I_O$, BER, etc.). The measurements are gathered to isolate a preferred list of targets and are then reported to $MSC_A$ 28 which selects one of the candidate base stations as the handoff base station. The handoff is then organized and executed.

If $MSC_B$ 36 were not present, $MSC_A$ 28 would receive a message which it did not understand. Since providing a separate MSC just to interpret different messages would place additional cost on the system provider, there is a need in the industry for a system that does not separate MSCs for different protocols.

Figure 2:
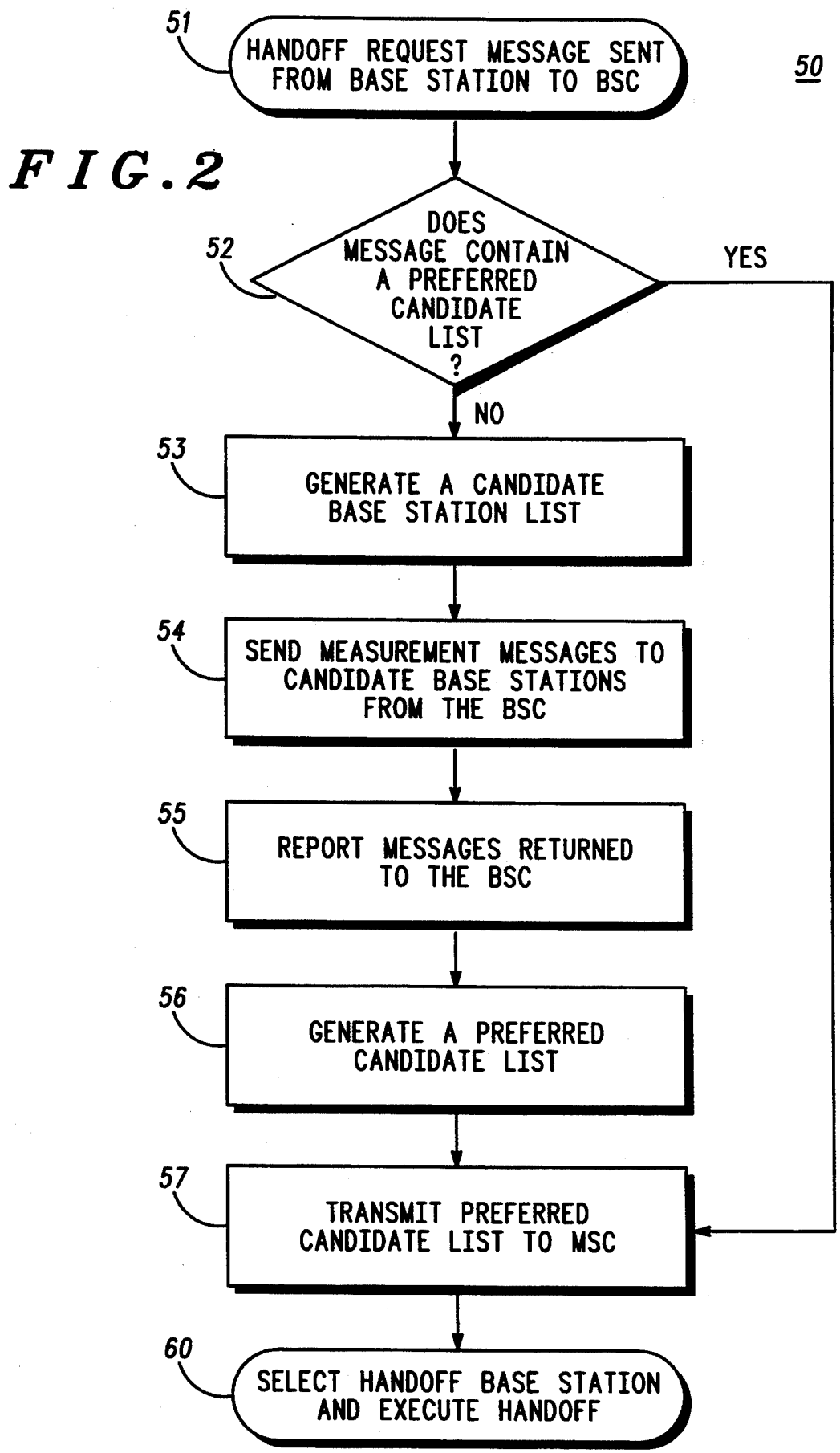
FIG. 2 is a flow chart representing the operation of the present invention.

The operation of the present invention is illustrated in the flow chart of FIG. 2, generally designated 50. The need for a handoff request is recognized when the mobile station signal quality has degraded sufficiently to warrant a new connection with another BS or a different channel within the same BS; or it is determined that the current mobile connection is detrimental to other mobile connections. In the present invention, a handoff message (also known as a Handoff Recommendation Message) is sent from a source base site to its BSC, step 51. If the handoff message contains a preferred candidate list, decision step 52, then a handoff message (such as a Handoff Required Message) is forwarded to its MSC, step 57. A handoff base station is selected from the preferred candidate list by the MSC and the handoff is executed, step 60, by sending a Handoff Request Message to the target base station.

If the handoff message received by the BSC does not contain a preferred candidate list, decision step 52, then a candidate base station list is generated, step 53, in the BSC. The BSC then initiates a dialog with candidate base stations to find a possible target. This is accomplished by sending measurement messages, such as a strength measurement request, to the base stations on the candidate list directing them to make measurements of a signal transmitted by the mobile station, step 54.

The message is sent from the source BSC to either: another base station serviced by the source BSC; another BSC; or another MSC. If to another MSC, the message is transmitted over the IS-41 interface between MSCs. This interface is also known as the E interface.

The messages should at least contain the channel type and radio channel number so that the candidate base site can make a measurement. In addition, a unique identifier for each measurement request should be provided. This is to distinguish one measurement from the next. Because the request is without a physical connection, the reference number allows association with a particular call connection. Reports, such as a strength measurement response, from the candidate base stations are then returned to the BSC, step 55. It is expected that the reference number will be returned to the source BSC with the corresponding response. This allows the source BSC to verify that the response to a particular request has been received. The BSC uses the reports to generate a preferred candidate list, step 56.

The preferred candidate list determines which candidates should be considered for handoff and arranges the candidates in order from best candidate to worst candidate. The general philosophy in executing a handoff is to attempt to hand the mobile off to the best available candidate.

The preferred candidate list is forwarded to the MSC, step 57, where a handoff base station is selected from the preferred candidate list and the handoff is executed, step 60.

As an alternative to the above, when the BSC receives a handoff request, decision step 52 may determine what type of base station the request came from in making the process decision.

Further, while the example above provided for handoff between base stations serviced by the source MSC, the handoff may have been required to a target MSC, such as MSC 30.

Figure 3:
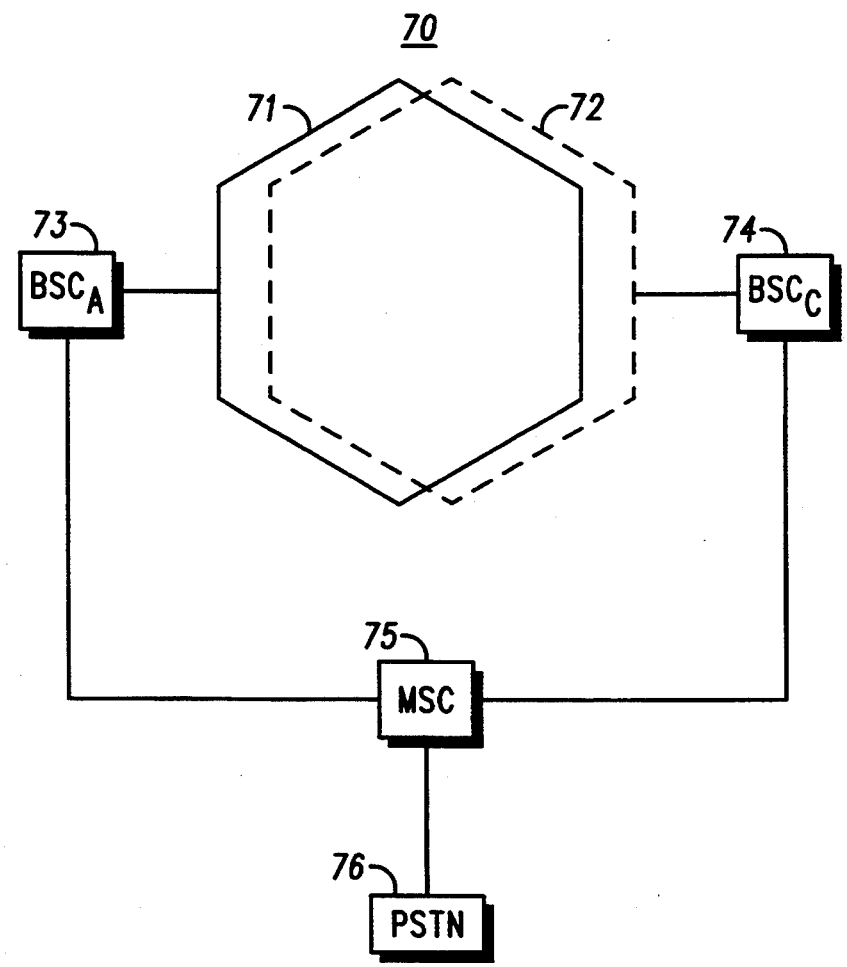
FIG. 3 is another cellular coverage diagram in which the present invention is utilized.

Another use of the present invention is where a service provider installs a second service overlaying the first service. This is illustrated in the system generally designated 70, FIG. 3. System 70 has two overlapping cellular areas: an original AMPS system 71 and a newly added TDMA system 72. Each system has a base site controller, 73 and 74 respectively. The present invention, operating as described in FIG. 2 above, enables the operator to implement the overlapping TDMA system using a single MSC 75 for both cells. Mobile switching center 75 then provides the system connection to a PSTN 76. Therefore, as a mobile moves out of either cell 71 or 72, a single MSC will be able to handle the two different handoff protocols.

Thus, it will be apparent to one skilled in the art that there has been provided in accordance with the invention, a method of performing handoff in a cellular communication system.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method of performing a handoff in a cellular communication system, said method comprising the steps of:

sending a handoff request from a source base station to a source base station controller;

generating, in said source base station controller, a candidate list of a plurality of candidate base stations;

transmitting a measurement request from said source base station controller to at least one of said plurality of candidate base stations on said candidate list;

measuring a signal from a mobile station at said at least one candidate base station;

reporting said measurement to said source base station controller;

generating a preferred list containing said measurement from said at least one candidate base station;

transmitting said preferred list from said source base station controller to a source mobile switching center;

selecting a handoff base station from said preferred list; and directing a handoff of said mobile station to said handoff base station.

2. The method of claim 1 wherein said measurement request is a signal strength measurement request.

3. The method of claim 1 wherein said measurement request is one of a energy per chip per total noise, a bit error rate, a frame erasure rate, and a word error rate.

4. The method of claim 1 further comprising the step of:

analyzing said handoff request received by said source base station controller to determine if said handoff request contains a preferred list; and transmitting said handoff request to said source mobile switching center if said handoff request contains said preferred list.

5. A method of performing a handoff in a cellular communication system, said method comprising the steps of:

sending a handoff request from a source base station to a source base station controller;

analyzing said handoff request received by said source base station controller to determine if said handoff request contains a preferred list of a plurality of candidate base stations;

transmitting said handoff request to a source mobile switching center if said handoff request contains said preferred list;

generating, in said source base station controller, a candidate list of a plurality of candidate base stations if said handoff request does not contain said preferred list;

transmitting a measurement request from said source base station controller to at least one of said plurality of candidate base stations on said candidate list;

measuring a signal from a mobile station at said at least one candidate base station;

reporting said measurement to said source base station controller;

generating a preferred list containing said measurement from said at least one candidate base station;

transmitting said preferred list from said source base station controller to a source mobile switching center;

selecting a handoff base station from said preferred list; and directing a handoff of said mobile station to said handoff base station.

6. The method of claim 5 wherein said measurement request is a signal strength measurement request.

7. The method of claim 5 wherein said measurement request is one of a bit error rate and a word error rate.

8. A method of performing a handoff in a cellular communication system, said method comprising the steps of:

sending a handoff request from a source base station to a source base station controller;

generating, in said source base station controller, a candidate list of a plurality of candidate base stations if said source base station is an analog base station;

transmitting said handoff request to a source mobile switching center if said source base station is a type base station other than said analog base station;

transmitting a measurement request from said source base station controller to at least one of said plurality of candidate base stations on said candidate list;

measuring a signal from a mobile station at said at least one candidate base station;

reporting said measurement to said source base station controller;

generating a preferred list containing said measurement from said at least one candidate base station;

transmitting said preferred list from said source base station controller to a source mobile switching center;

selecting a handoff base station from said preferred list; and directing a handoff of said mobile station to said handoff base station.

* * * * *